United States Patent [19]

Lancaster et al.

[11] Patent Number: 5,378,791

[45] Date of Patent: Jan. 3, 1995

[54] PHENOLIC RESINS

[75] Inventors: Michael Lancaster; David J. Moreton; Alexander F. Psaila, all of Hull, England

[73] Assignee: BP Chemicals Limited, London, England

[21] Appl. No.: 58,828

[22] Filed: May 5, 1993

Related U.S. Application Data

[63] Continuation of Ser. No. 771,290, Oct. 3, 1991, abandoned.

[30] Foreign Application Priority Data

Oct. 6, 1990 [GB] United Kingdom ............... 9021760
Oct. 27, 1990 [GB] United Kingdom ............... 9023407

[51] Int. Cl.$^6$ .................................................. C08G 8/04
[52] U.S. Cl. ........................................ 528/137; 528/145; 528/157; 528/165; 568/716
[58] Field of Search ............... 528/137, 145, 157, 165; 568/716

[56] References Cited

U.S. PATENT DOCUMENTS

| | | | |
|---|---|---|---|
| 1,996,069 | 4/1935 | Honel | 528/145 |
| 3,677,986 | 7/1972 | Buchanan | 524/594 |
| 3,737,465 | 6/1973 | Karll et al. | 260/619 A |
| 3,870,669 | 3/1975 | Hofel et al. | 528/145 |
| 4,259,464 | 3/1981 | Buriks et al. | 525/480 |

FOREIGN PATENT DOCUMENTS

| | | | |
|---|---|---|---|
| 0447977 | 9/1991 | European Pat. Off. | C07C 37/20 |
| 2038001 | 10/1979 | Germany | C08G 00/00 |

OTHER PUBLICATIONS

J. Am. Chem. Soc. 1981, 103, 3782-3792 Gutsche et al.
Chem. Abstracts 105(6):43695j Ludwig et al.
Makromol. Chem. Rapid. Commun. 3, 65-67(1982) Ninagawa et al.
Makromol. Chem. 188, 921-950(1987) Dhawan et al.

*Primary Examiner*—John Kight, III
*Assistant Examiner*—Richard Jones
*Attorney, Agent, or Firm*—Brooks Haidt Haffner & Delahunty

[57] ABSTRACT

This invention relates to a process for producing low molecular weight phenol-aldehyde resin which has predominantly 4 phenolic units in a chain and in which the phenolic ring has a substituent R which is an alkyl group and optionally contains methylol groups on either end of the chain, by reacting formaldehyde with p-alkyl phenol in the presence of ammonia as base in a liquid reaction medium. The resins can be used in producing demulsifiers.

9 Claims, No Drawings

PHENOLIC RESINS

This is a continuation of application Ser. No. 07/771,290, filed Oct. 3, 1991 as Express Mail No. GB148300526 now abandoned.

The present invention relates to a method of preparation low molecular weight phenolic resins, and to the use of such resins as demulsifiers or surfactants.

It is well known to produce phenolic resins of a relatively high molecular weight by reacting phenol with an aldehyde such as formaldehyde in the presence of a base such as an alkali metal hydroxide at elevated temperature. However, the same procedure does not give rise to low molecular weight resins, especially those having a narrow molecular weight distribution.

It has been found that such low molecular weight resins can be produced by controlling the reaction conditions and the base catalyst used for the condensation of phenol with aldehyde.

Accordingly, the present invention is a process for producing low molecular phenol-aldehyde resin of the formula:

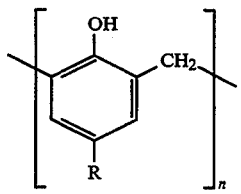

wherein R is an alkyl group and n is predominantly 4 and wherein said structure optionally contains methylol groups on either end of the chain, by the reaction of formaldehyde with p-alkyl phenol in the presence of ammonia as base in a liquid medium.

The p-alkyl phenol reactant suitably has 4–18 carbon atoms in the alkyl group, preferably 4–12 carbon atoms and is most preferably a tertiary alkyl group such as e.g. a tertiary butyl group.

The formaldehyde used may be in any form commercially available such as e.g. formaldehyde as such or as formalin solution or as paraformaldehyde provided that the reactant used can readily generate the formaldehyde monomer in situ under the reaction conditions.

Similarly, the p-alkyl phenol may be used as such as a pure compound or as a commercial sample. The alkyl phenol most preferred is p-tertiary butyl phenol (hereafter referred to as "PTBP" for convenience).

The reaction is carried out in a liquid medium, preferably in a hydrocarbon solvent which is inert under the reaction conditions such as e.g. "KEMELIX" H 610 (Redg Trade Mark, petroleum derived solvent high in aromatic content and consisting mainly of $C_9$ and $C_{10}$ alkyl benzenes, ex ICI).

The product (I) so formed can be optimised to produce a resin of a narrow molecular weight distribution by controlling the reaction conditions.

In order to maximise the yield of (I) it is preferable to use formalin (an aqueous solution of formaldehyde containing from 35 to 60% w/w of formaldehyde). This can be reacted in the presence of ammonia with an equimolar amount of p-alkyl phenol such as e.g. PTBP, initially by raising the reaction temperature to about 85° C. and then maintaining the reaction mixture at this temperature for about 90 minutes. The pH of the reaction mixture at this stage is suitably in the range from 7.5 to 9.0. If it is below 7.5 further aliquots of ammonia have to be added to bring the pH level to within the range specified above. To the reaction mixture an antifoam e.g. ANTIFOAM A (filled polydimethylsiloxane ex Dow Corning UK) can be added at this stage. Thereafter, the reaction mixture can be heated further to a temperature to 95°–120° C. at which point water is removed from the system as rapidly as is practicable to reduce the water content of the reaction mixture to an extent that at least 90% of the theoretical amount of water generated by the condensation reaction (in addition to the removal of any water that may be added from an external source such as e.g. that present in the formalin reactant). Thus the water content of the reaction mixture at this stage should suitably be below 0.5% w/w. This stage should under ambient pressure conditions be achieved within about 3 hours of the commencement of ammonia addition. Upon removal of water, with controlled heating, the reaction temperature will go up to 120°–140° C. When the reaction temperature reaches about 120° C., the reaction mixture is held at this temperature for about an hour and then the temperature can be allowed to rise again to 130°–140° C. and the reaction mixture held at this temperature for a further period of 3–5 hours for completion of the reaction. The completion of the reaction can be monitored by monitoring the Relative Solubility Number (hereafter "RSN") of a sample taken from the reaction mixture. The RSN as used herein is an in-house test developed within BP Chemicals Ltd and is used to determine the solubility of the phenolic resin in water which in turn enables the degree of polymerisation of the monomer to be ascertained. The test involves initially dissolving the resin sample (e.g. 2g±0.05 g) in 25 ml toluene. 5 ml of the toluene solution is stirred with 50 ml of 1,4-dioxan to obtain a mixed solution of the polymer in toluene/dioxan. This mixture solution is then titrated with water at 25° C. until it becomes cloudy and remains cloudy for 1 minute. The greater the degree of polymerisation, the less the amount of water required to attain cloudiness. The solubility number equals the ml of water titrated. In the present case the desirable RSN value of the resin should be in the region of 16–17 in order to ensure that the product has the desired structure, a free phenol content of about 17% by GLC (<27% by GPC), a water content of no more than 0.5% and a viscosity in centistokes of 100–300 at 25° C.

A feature of the present invention is that in addition to the straight chain phenolic resins of formula (I) defined above, the process also yields significant quantities of calixarenes, e.g. up to 50% w/w of the reaction product.

The low molecular weight phenolic resins of the present invention are particularly suited to the manufacture of demulsifiers in the form of their alkoxylates.

The present invention is further illustrated with reference to the following Examples.

Example 1

A 40 kg capacity steam jacketed stainless steel-lined vessel was used, with stirer, column, condenser and Dean and Stark trap to carry out the reaction. The jacket was adapted to use oil, if necessary. The vessel was charged with p-t-butyl phenol (13.4 kg ex Schenectady), 44.13% formalin (7.45 kg), KEMELIX H610 (Regd Trade Mark, 13.4 kg, alkyl benzene solvent ex ICI) and 25.9% aqueous ammonia (26 mls). A slight exotherm from 20 to 22° C. was noted on addition of ammonia. The reaction mixture was then heated to 50° C. and sampled for pH to ensure that is was above 7.5 and held at 50° C. for 30 minutes and then 2 ml of a silane ANTIFOAM A filled polydimethylsiloxane (ex Dow Chemicals) was added. The reaction mixture was then heated to 85° C. and held at that temperature for 90 minutes, followed by careful heat to reflux. At 95° C. water began to be removed via the Dean and Stark, and the water was distilled off as quickly as reasonably possible. After 90 minutes the temperature had reached 120° C. for 1 hour and a further 90 g of water was collected. The reaction mixture was then heated directly to 140° C. and held at this temperature for 4 hours, after which duration the product upon sampling had an RSN of 16.6 and hence within the desired specification. A total of 5.71 kg of water, 95% of theoretical, was collected. The water content of the batch was measured to be 0.55%, which is marginally above the desired specification of 0.5%. Hence the reaction mixture was vacuum stripped under reflux at 100° C., using up to 26 inches of vacuum, for 30 minutes. This reduced the water content of the product to 0.08%. The free phenol content of the batch was measured at 16.8% which is well within the desired specification.

The identity of the resin was confirmed by GPC. The specification of the product is tabulated below for ease of comparison with that desired.

Example 2

A 6 tonne capacity steam jacketed stainless steel-lined vessel was used, with stirrer, column, condenser and Dean and Stark trap to carry out the reaction. The jacket was adapted to use oil, if necessary. The vessel was charged with p-t-butyl phenol (3025 kg ex Schenectady), 44.1% formalin (1681 kg), KEMELIX H610 (Regd Trade Mark, 3125 kg, alkyl benzene solvent ex ICI) and 25% aqueous ammonia (151 kg). A slight exotherm from 29 to 40° C. was noted on addition of ammonia. The reaction mixture was then heated to 50° C. and sampled for pH to ensure that it was about 7.7 and held at 50° C. for 30 minutes and then 1 kg of a 3% silicone ANTIFOAM A filled polydimethylsiloxane was added. The reaction mixture was then heated to 85° C. and held at that temperature for 90 minutes. The reaction mixture was heated gently to 100° C. when water began to be removed via the Dean and Stark, and the water was distilled off as quickly as reasonably possible. For 135 minutes the temperature remained at 100° C. during which time the distillate contained about about 70% water. About 1350 kg of water was collected. The reaction mixture at this stage rose from 100° C. to 120° C. and a further 65 kg water was collected. The temperature was held at 120° C. for 1 hour. The reactor contents were then heated directly to 140° C. and held at this temperature for 3 hours 45 minutes, after which duration the product upon sampling, every 45 minutes had an RSN of 16.9 and hence within the desired specification. A further amount of water was collected to bring the total to 1460 kg of water, 95% of theoretical, was collected. The water content of the batch was measured to be 0.04%. The free phenol content of the batch was measured at 16.8% which is well within the desired specification.

The resin was retested for RSN as previously and had a value of 16.3. The batch was then cooled to room temperature and stored in drums without any filtration. The yield was 6149 kg and the total batch time was 20 hours. The specification of the product is tabulated below for ease of comparison with that desired.

| Test | SPECIFICATION Desired | Found Example 1 | Found Example 2 |
|---|---|---|---|
| RSN (ml at 25° C.) | 16.3–16.9 | 16.6 | 16.3 |
| Water Content | 0.5% max | 0.08% | 0.04% |
| Viscosity (cSt at 25° C.) | 100–300 | 190 | — |
| Appearance | Red-brown suspension | Red-brown suspension | Red-brown suspension |
| GPC | Standard | Substantially similar to Standard | Substantially similar to Standard |
| Free Phenol Content | <17% (GPC) | 16.8% (GLC) | 10% (GLC) |

We claim:

1. A process for producing low molecular weight phenol-aldehyde resin of the formula (I):

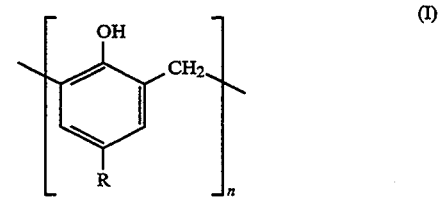

wherein R is an alkyl group and n is predominantly 4 and wherein said structure optionally contains methylol groups on either end of the chain, said formula (I) including up to 50% w/w calixarenes by
  reacting formaldehyde with p-alkyl phenol in the presence of ammonia as base in a liquid reaction medium to attain a reaction mixture having a pH value of 7.5 to 9.0,
  initially raising the temperature of the reaction mixture to about 85° C. and maintaining said pH and said temperature for a duration,
  thereafter increasing the temperature of the reaction mixture to between 95° C. and 120° C. while rapidly removing water from the reaction mixture to reduce the water content thereof to below 0.5% w/w,
  holding the temperature of the reaction mixture at about 120° C. for a duration, and
  thereafter allowing the temperature of the reaction mixture to rise until completion of reaction.

2. A process according to claim 1 wherein the p-alkyl phenol has 4–18 carbon atoms in the alkyl group.

3. A process according to claim 1 wherein the alkyl group in the p-alkyl phenol is a tertiary alkyl group.

4. A process according to claim 1 wherein the p-alkyl phenol is p-tertiary butyl phenol.

5. A process according to claim 1 wherein the formaldehyde reactant is generated as a monomer in situ under the reaction conditions from a source of formaldehyde which is not monomeric.

6. A process according to claim 1 wherein the liquid reaction medium is a hydrocarbon solvent which is inert under the reaction conditions.

7. A process according to claim 1 wherein the liquid reaction medium is a hydrocarbon solvent high in aromatic content and consists mainly of $C_9$ and $C_{10}$ alkyl benzenes.

8. A process according to claim 1 including determining the completion of the reaction by achieving a Relative Solubility Number of the reaction mixture in the region of 16–17, a free phenol content of 17% as determined by GLC (<27% by GPC), a water content of no more than 0.5% and a viscosity of 100–300 centistokes at 25° C. in the reaction mixture.

9. A process for producing a reaction product comprising i) low molecular weight phenol-aldehyde resin of the formula (I):

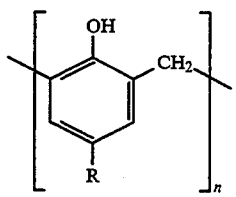

(I)

wherein R is an alkyl group and n is predominantly 4 and wherein said structure optionally contains methylol groups on either end of the chain and ii) up to about 50% w/w calixarenes, by:

reacting formaldehyde with p-alkyl phenol in the presence of ammonia as base in a liquid reaction medium to attain a reaction mixture having a pH value of 7.5 to 9.0, initially raising the temperature of the reaction mixture to about 85° C. and maintaining said pH and said temperature for a duration, thereafter increasing the temperature of the reaction mixture to between 95° C. and 120° C. while rapidly removing water from the reaction mixture to reduce the water content thereof to below 0.5% w/w, holding the temperature of the reaction mixture at about 120° C. for a duration, and thereafter allowing the temperature of the reaction mixture to rise until completion of reaction.

* * * * *

UNITED STATES PATENT AND TRADEMARK OFFICE
CERTIFICATE OF CORRECTION

PATENT NO. : 5,378,791
DATED : January 3, 1995
INVENTOR(S) : MICHAEL LANCASTER, DAVID J. MORETON and ALEXANDER F. PSAILA It is certified that error appears in the above-indentified patent and that said Letters Patent is hereby corrected as shown below:

Col. 3, line 43, before "was" insert (ex Dow Chemicals)

Col. 3, l. 50, should read "contained about 70%"

Col. 4, l. 35, insert a colon (:) after by:

Signed and Sealed this

Ninth Day of May, 1995

Attest:

BRUCE LEHMAN

Attesting Officer        Commissioner of Patents and Trademarks

UNITED STATES PATENT AND TRADEMARK OFFICE
CERTIFICATE OF CORRECTION

PATENT NO. : 5,378,791
DATED : January 3, 1995
INVENTOR(S) : Michael Lancaster, et. al.

It is certified that error appears in the above-indentified patent and that said Letters Patent is hereby corrected as shown below:

Title page, item [63], should read-- Continuation of Serial No. 771,290, Oct. 4, 1991, abandoned, which is a continuation-in-part of Serial No. 770,504 filed October 3, 1991.

Col. 1, change the first paragraph to read-- This is a continuation of application Serial No. 771,290 filed October 4, 1991 which, in turn, is a continuation-in part of application Serial No. 770,504 filed October 3, 1991.

Signed and Sealed this

Thirtieth Day of May, 1995

Attest:

BRUCE LEHMAN

Attesting Officer     Commissioner of Patents and Trademarks